(12) United States Patent
Fox

(10) Patent No.: US 9,962,640 B2
(45) Date of Patent: May 8, 2018

(54) FRAMED AIR FILTER WITH INTEGRATED NESTABLE JOINT

(71) Applicant: 3M INNOVATIVE PROPERTIES COMPANY, St. Paul, MN (US)

(72) Inventor: Andrew R. Fox, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 441 days.

(21) Appl. No.: 14/665,078

(22) Filed: Mar. 23, 2015

(65) Prior Publication Data

US 2015/0265957 A1    Sep. 24, 2015

Related U.S. Application Data

(60) Provisional application No. 61/969,595, filed on Mar. 24, 2014.

(51) Int. Cl.
*B01D 46/00* (2006.01)
*B01D 46/10* (2006.01)
*B03C 3/28* (2006.01)

(52) U.S. Cl.
CPC ..... *B01D 46/0001* (2013.01); *B01D 46/0016* (2013.01); *B01D 46/0024* (2013.01); *B01D 46/10* (2013.01); *B03C 3/28* (2013.01); *Y10T 29/49826* (2015.01)

(58) Field of Classification Search
CPC combination set(s) only.
See application file for complete search history.

(56) References Cited

U.S. PATENT DOCUMENTS

| | | | | |
|---|---|---|---|---|
| 2,723,731 A * | 11/1955 | Schaaf | B01D 29/012 | 403/382 |
| 3,023,839 A * | 3/1962 | Best | B01D 46/10 | 156/202 |
| 3,031,047 A * | 4/1962 | Williams | B01D 46/10 | 210/451 |
| 3,467,257 A * | 9/1969 | Getzin | B01D 46/10 | 210/484 |
| 3,793,692 A * | 2/1974 | Tate | B01D 46/10 | 210/484 |
| 3,830,045 A * | 8/1974 | Copenhefer | B01D 46/10 | 55/501 |
| 3,938,973 A * | 2/1976 | Kershaw | B01D 46/0002 | 55/501 |
| 3,970,440 A * | 7/1976 | Copenhefer | B01D 46/10 | 55/486 |
| 4,086,071 A * | 4/1978 | Champlin | B01D 46/10 | 229/168 |

(Continued)

*Primary Examiner* — Christopher P Jones
*Assistant Examiner* — Britanny Precht
(74) *Attorney, Agent, or Firm* — Kenneth B. Wood

(57) ABSTRACT

The present disclosure relates generally to air filter frames. In some embodiments, the air filter frames are nestable. Nestable air filter frames of the type described herein offer significantly reduced shipping volume, and thus shipping costs, while also providing cost-effective manufacturing. Some embodiments relate to an air filter frame including a single strip of framing material forming at least two of the four major frame segments and the frame corner between the two major frame segments. In some embodiments, a single strip of framing material forms at least three of the four major frame segments and two of the frame corners.

13 Claims, 8 Drawing Sheets

(56) References Cited

U.S. PATENT DOCUMENTS

| | | | | |
|---|---|---|---|---|
| 4,105,423 A * | 8/1978 | Latakas | B01D 46/0002 55/501 |
| 4,323,379 A * | 4/1982 | Shearin | B01D 46/10 55/511 |
| 4,372,763 A * | 2/1983 | Champlin | B01D 46/0016 55/501 |
| 4,420,315 A * | 12/1983 | Kershaw | B01D 46/00 206/509 |
| 4,464,187 A * | 8/1984 | Kershaw | B01D 46/00 206/509 |
| 4,570,844 A * | 2/1986 | Wysocki | B65D 5/2009 229/100 |
| D283,438 S * | 4/1986 | Doyle | D23/365 |
| 4,636,233 A * | 1/1987 | Lizmore | B01D 46/0002 229/172 |
| 5,505,852 A * | 4/1996 | van Rossen | B01D 46/10 210/493.3 |
| 5,800,588 A * | 9/1998 | Miller | B01D 46/0005 55/494 |
| 5,810,898 A * | 9/1998 | Miller | B01D 46/10 55/501 |
| 6,033,454 A * | 3/2000 | Hoeffken | B01D 46/0016 55/494 |
| 6,209,724 B1 * | 4/2001 | Miller | B65D 5/72 206/449 |
| 6,406,509 B1 | 6/2002 | Duffy | |
| 6,656,243 B2 * | 12/2003 | Hodge | B01D 46/0036 55/418 |
| 6,740,137 B2 * | 5/2004 | Kubokawa | B01D 46/10 55/444 |
| 6,758,878 B2 * | 7/2004 | Choi | B01D 39/1623 55/497 |
| 6,926,781 B2 | 8/2005 | Duffy | |
| 7,025,797 B2 * | 4/2006 | Zettel | B01D 25/001 55/282.3 |
| 7,122,255 B2 | 9/2006 | Choi et al. | |
| 7,118,610 B2 * | 10/2006 | Lipner | B01D 46/0002 55/495 |
| 7,261,757 B2 * | 8/2007 | Duffy | B01D 46/0001 55/497 |
| 7,537,630 B2 * | 5/2009 | Schuld | B01D 46/0005 55/495 |
| 7,758,667 B2 * | 7/2010 | Ashwood | B01D 46/10 55/481 |
| 7,776,123 B2 * | 8/2010 | Lawrence | B01D 46/0004 55/497 |
| 8,021,454 B2 * | 9/2011 | Braunecker | B01D 46/0013 55/483 |
| 2003/0192293 A1 * | 10/2003 | Choi | B01D 39/1623 55/497 |
| 2004/0182055 A1 * | 9/2004 | Wynn | B01D 46/0001 55/497 |
| 2007/0204573 A1 * | 9/2007 | Justice | B01D 46/0013 55/495 |
| 2007/0204574 A1 * | 9/2007 | Workman | B01D 46/0004 55/495 |
| 2007/0271887 A1 * | 11/2007 | Osborne | B01D 46/0001 55/495 |
| 2007/0289271 A1 * | 12/2007 | Justice | B01D 46/0002 55/495 |
| 2007/0289274 A1 * | 12/2007 | Justice | B01D 46/0002 55/511 |
| 2008/0016835 A1 * | 1/2008 | Justice | B01D 46/0002 55/501 |
| 2008/0163595 A1 * | 7/2008 | Knapp | B01D 46/0002 55/498 |
| 2009/0183477 A1 * | 7/2009 | Workman | B01D 46/0002 55/495 |
| 2009/0301044 A1 * | 12/2009 | Miller | B01D 46/0001 55/475 |
| 2010/0263542 A1 * | 10/2010 | Heberer | B01D 46/0005 96/407 |
| 2013/0327004 A1 * | 12/2013 | Lise | B01D 46/0002 55/493 |

* cited by examiner

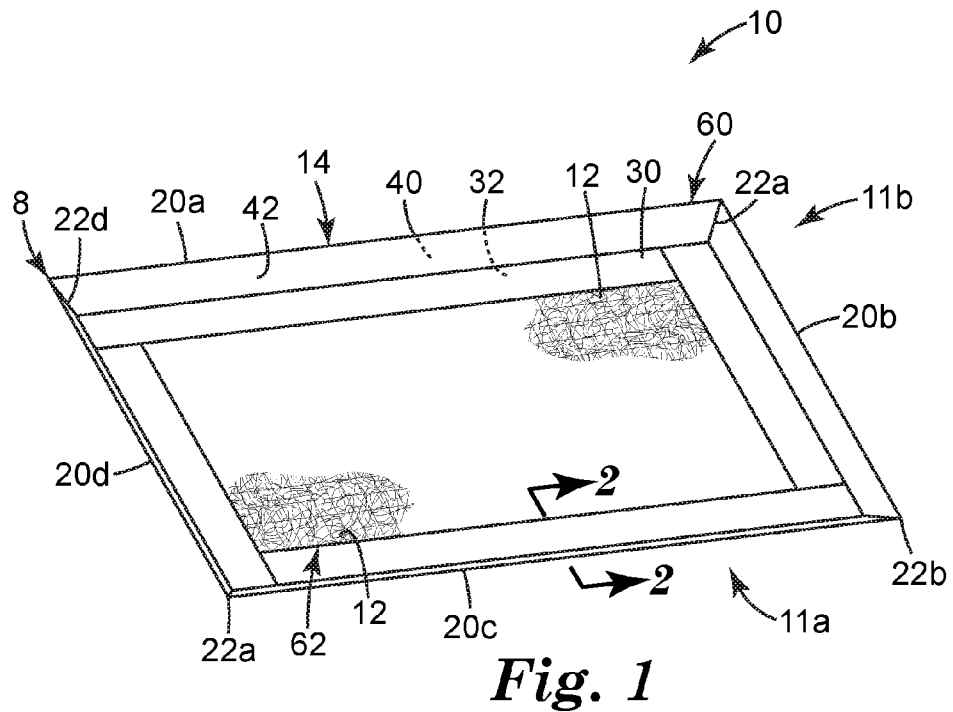
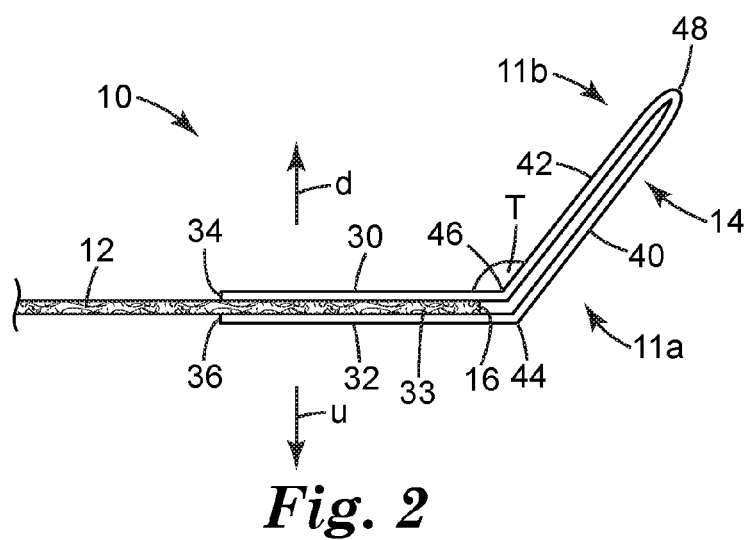

FRAMED AIR FILTER WITH INTEGRATED NESTABLE JOINT

TECHNICAL FIELD

The present disclosure relates to air filters. More particularly, it relates to frame components useful with air filters.

BACKGROUND

Air filters are commonly used in forced air systems (e.g., residential heating and air-conditioning systems) in order to remove dust and dirt particles and the like. Air filter products typically include a filtration media surrounded and supported by a frame. Additional supporting components, such as a mesh screen, adhesive beads, etc., may also be included. However, the frame is not only sized and shaped to partially enclose and support the filtration media, but also sized and shaped so that the air filter product can be inserted or supported in place based upon a particular end-use application. As a point of reference, the three-dimensional shape of an air filter product includes a length, width, and depth. In the case of a rectangular air filter product, for example, a rectangular filtration media is surrounded at its four sides by frame pieces or segments that may be connected at the corners and/or connected to the four side edges of the filtration media. The majority of the filtration media is thus capable of use for its filtering ability, with air flow through the filtration media occurring in the depth direction. Many end-use applications have a filter-receiving housing with established length, width, and depth dimensions; the air filter product's outer dimensions desirably match one or more of the expected housing length, width and/or depth dimensions to achieve robust retention of the air filter product upon insertion into the housing.

Air filter frame elements are known to be made from a variety of materials, including metal, plastic, and paperboard. In many instances, a selected construction of the air filter frame is a function of the filtration media format. For example, the filtration media can be formed to a pleated or other three-dimensional shape. The frames associated with these filtration media formats must accommodate the elevated, overall three-dimensional depth. In other instances, the filtration media can be relatively flat or planar (e.g., non-pleated). In theory, the frame could also have a relatively minimal depth (corresponding with that of the flat filtration media format); however, in order to facilitate robust retention within the expected end-use filter-receiving housing, the frame will oftentimes define an elevated depth (as compared to a thickness or depth of the flat filtration media), including side panels or walls projecting well away from a major surface of the filtration media to define an overall depth of the air filter product that corresponds with the depth of the end-use filter-receiving housing.

The projecting frame format associated with many flat filtration media-based air filter products has been found to present a unique opportunity for reduced shipping costs. In particular, the depth-defining side panels or walls can be formed to extend at a non-perpendicular angle relative to the plane of the flat filtration media. With this design, a first air filter product can nest "inside" the frame of a second air filter product when stacked on top of the other. This nested or stacked arrangement significantly reduces the resultant shipping volume, and thus shipping costs, when the air filter products are delivered in bulk. These same nested arrangements, and thus shipping cost savings, can also be accomplished with other air filter product designs, including pleated filtration media-based products having projecting frame walls or panels establishing the air filter product's overall depth.

One example of a nesting frame construction for a flat filtration media air filter product is provided in U.S. Publication No. 2013/0327004, entitled "Framed Air Filter with Offset Slot, and Method of Making," the entire teachings of which are incorporated herein. The frame design of the '004 Publication is a strip-frame, which means that individual frame pieces are cut as linear strips for a continuous roll of frame material (e.g., chipboard) with very little waste. Four distinct or discrete strips are used to complete a rectangular air filter product. The nested strip frame design of the '004 Publication, while excellent in reducing shipping costs, may come with a penalty in manufacturing productivity due to the need to assemble four strip pieces.

Standard strip frames for non-nesting filters often have a hinged corner joint, which allows for rapid assembly in manufacturing because the hinge design reduces the number of frame pieces from four to two or even one. However, the hinged frame is not designed to provide filter-to-filter nesting such that the shipping and cost savings described above are not available.

Single piece nestable frames for flat filtration media air filter products are known, for example fiberglass-based residential air filter products available from Flanders Corp. However, these known frames are die-cut from a single piece of chipboard in a "box frame style" configuration and are accordingly much more expensive than a perimeter-only strip frame.

SUMMARY

The inventors of the present application recognized a need for an air filter having a nestable perimeter strip frame that can be assembled in a cost- and time-efficient manner.

Aspects of the present disclosure are directed toward air filter frame strips useful for framed air filters, and related methods of assembly and manufacture.

Some embodiments relate to a frame capable of being used in an air filter, wherein the frame includes four major frame segments, comprising: a single strip of framing material forming at least two of the major frame segments and the frame corner between the two major frame segments; and wherein the frame is nestable.

Some embodiments relate to a frame capable of being used in an air filter, comprising between two and three strips that cooperatively form the frame; and at least one nestable corner. Some embodiments have at least two nestable corners.

Some embodiments relate to a frame capable of being used in an air filter, comprising: a material strip including: (1) first and second downstream panels, (2) first and second inner side walls interconnected to a corresponding one of the downstream panels at a fold line, (3) first and second outer side walls interconnected to a corresponding one of the inner side walls at a fold line, (4) first and second upstream panels interconnected to a corresponding one of the outer side walls at a fold line, (5) a joint portion formed at region of intersection between the first and second outer side walls, the joint portion including: (a) a first, vertical score line interconnecting the first and second outer side walls, (b) a second score line in the first outer side wall and extending in non-perpendicular fashion immediately adjacent the first score line, (c) a third score line in the second outer side wall and extending in non-perpendicular fashion immediately adjacent the first score line, (d) a first cut-out portion separating the first and second downstream panels and separating the first and second inner side walls, and (e) a second cut-out portion locating adjacent the joint portion and separating the first and second upstream panels.

Some embodiments relate to a method of at least partially assembling at least a portion of a frame of a framed air filter, the method comprising: (1) receiving a material strip defining: (a) first and second downstream panels, (b) first and second inner side walls interconnected to a corresponding one of the downstream panels at a fold line, (c) first and second outer side walls interconnected to a corresponding one of the inner side walls at a fold line, (d) first and second upstream panels interconnected to a corresponding one of the outer side walls at a fold line, (e) a joint portion formed at region of intersection between the first and second outer side walls, the joint portion including: (f) a first, vertical score line interconnecting the first and second outer side walls, (g) a second score line in the first outer side wall and extending in non-perpendicular fashion immediately adjacent the first score line, (h) a third score line in the second outer side wall and extending in non-perpendicular fashion immediately adjacent the first score line, (i) a first cut-out portion separating the first and second downstream panels and separating the first and second inner side walls, (j) a second cut-out portion locating adjacent the joint portion and separating the first and second upstream panels; (2) folding the material strip at the joint portion to bring the first and second outer side walls toward one another, including the joint folding at each of the first-third score lines and further including the second and third score lines being brought into substantial abutment to define a corner; (3) further folding the material strip to locate the first inner side wall over the first outer side wall, the first downstream panel over the first upstream panel, the second inner side wall over the second outer side wall, and the second downstream panel over the second upstream panel; wherein following the steps of folding, the material strip is transitioned to define first and second major frame segments intersecting at a corner.

In some embodiments, the single strip forms three of the major frame segments and two frame corners between the three major frame segments.

In some embodiments, each major frame segment includes a first side wall and a second side wall and wherein the first side wall and the second side wall are at least one of (1) generally parallel to one another or (2) positioned at an angle of less than about 40 degrees to one another. In some embodiments, each of the first and second side walls have a side wall tilt angle that is between about 95 degrees and about 150 degrees. In some embodiments, each of the first and second side walls have a side wall tilt angle that is between about 100 degrees and about 130 degrees. In some embodiments, the first side wall and second side wall have a foldable connection therebetween. In some embodiments, the foldable connection is at least one of a score line and/or a fold line. Some embodiments further include one or more self-retention features. In some embodiments, the self-retention feature includes at least one locking tab on or adjacent to one or more of the major frame segments; at least one slot on or in one or more of the other major frame segments; and wherein the tab(s) is/are capable of being inserted or tucked into the slot(s). In some embodiments, the self-retention features include an adhesive. In some embodiments, the frame corner is a triangular inwardly folding corner. In some embodiments, the frame corner is asymmetric by between about 0.01 mm and about 1 mm.

Some embodiments further include air filtration media attached to or adjacent to the frame; and wherein the air filtration media is at least one of pleated or flat. In some embodiments, the air filtration media is at least one of a nonwoven material, an electret-comprising nonwoven material, or a fiberglass-containing material. Some embodiments further include at least one of an open cell structure layer, a porous media layer, a nonwoven scrim layer, a reinforcing filament layer, a netting, and/or a wire mesh.

In some embodiments, the frame strip includes a hinge joint integrated between two frame sides. When manipulating or folding the frame strip from a flat state toward a final state in which the two frame sides are assembled to a respective edge of an air filter media, the hinge joint facilitates formation of a common corner between the frame sides and side walls of the frame sides arranged at a tilt angle relative to upstream and downstream panels thereof.

BRIEF DESCRIPTION OF THE DRAWINGS

FIG. 1 is a perspective view of an exemplary framed air filter in accordance with principles of the present disclosure, viewed from the downstream side of the framed air filter.

FIG. 2 is a cross-sectional view of a portion of the framed air filter of FIG. 1, taken along the line 2-2.

DETAILED DESCRIPTION

Figure 3:
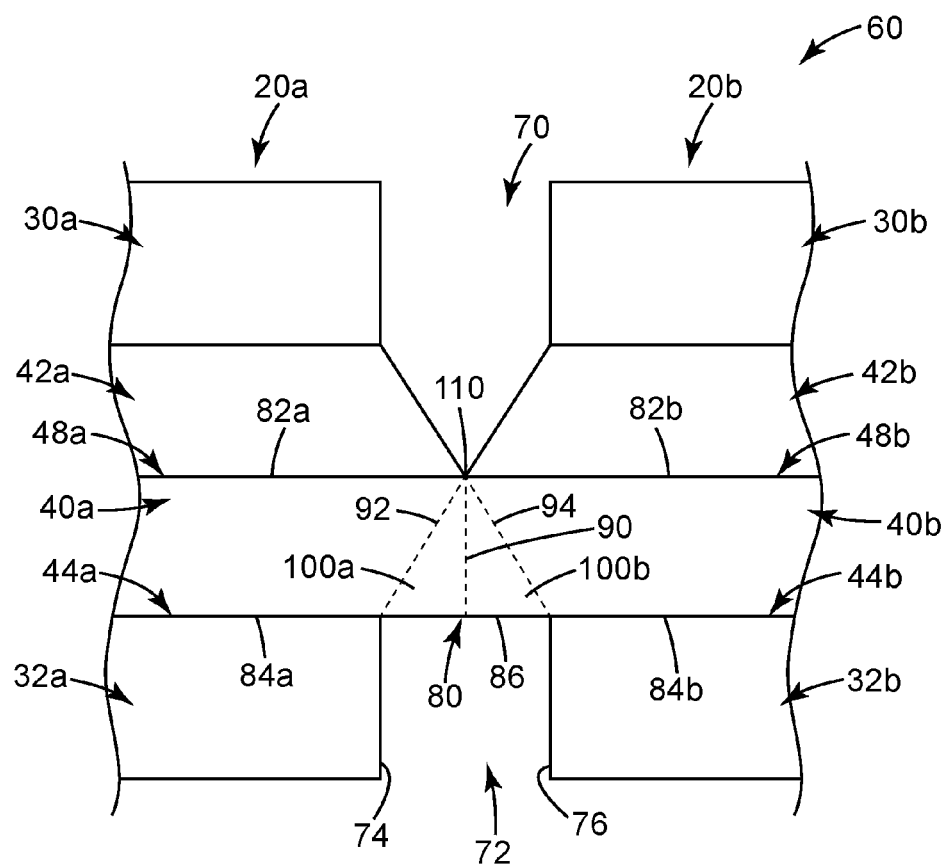
FIG. 3 is a plan view of an exemplary material strip in a flat state and useful in forming two or more major frame segment components of the framed air filter of FIG. 1.

Although directional terminology such as "top", "bottom", "upper", "lower", "under", "over", "front", "back", "up" and "down" may be used in this disclosure, it will be understood that those terms are used in their relative sense only unless otherwise noted. Terms such as "outer", "outward", "outwardmost", "outwardly" and the like mean in a direction generally away from the geometric center of the air filter media. Terms such as "inner", "inward", "inwardmost", "inwardly" and the like mean in a direction generally toward the geometric center of the air filter media. As used herein as a modifier to a property, attribute or relationship, the term "generally", unless otherwise specifically defined, means that the property, attribute or relationship would be readily recognizable by a person of ordinary skill but without requiring absolute precision of a perfect match (e.g., within +/−20% for quantifiable properties); the term "substantially" means to a high degree of approximation (e.g., within +/−10% for quantifiable properties) but again without requiring absolute precision or a perfect match.

As used herein, the term "upstream" is used to denote the closed-ended side of a framed air filter, corresponding to the far side of a framed air filter 10 as shown in FIG. 1 and to the lower side of the framed air filter 10 as shown in FIG. 2. Certain figures of the present disclosure are marked with "u" to aid in recognition of the upstream side of the framed air filter and components.

As used herein, the term "downstream" is used to denote the open-ended side of such a framed air filter (the side to which the filter frame side walls protrude), corresponding to the near side (the visible side) of the framed air filter 10 as shown in FIG. 1 and to the upper side of the framed air filter 10 as shown in FIG. 2. Certain figures of the present disclosure are marked with "d" to aid in recognition of the downstream side of the framed air filter and components.

The terms upstream and downstream are used purely for convenience of description herein, in recognition of the observation that such framed air filters are often placed into forced air ventilation systems with the closed-ended side of the framed air filter facing the stream of incoming air (i.e., facing upstream) and with the open-ended side of the framed air filter facing downstream (e.g., with the terminal ends of the side walls resting against support flanges of the forced air ventilation system). However, it will be appreciated that in some cases, such framed air filters might be placed in an airstream in the reverse orientation; thus, it is emphasized that the terms "upstream" and "downstream" are used herein merely for convenience of description of the various components of the framed air filter and their geometric relationship, irrespective of how such a framed air filter might be eventually installed into a forced air ventilation system.

Shown in FIG. 1 in perspective view from the downstream side is an exemplary framed air filter 10 in accordance with principles of the present disclosure. FIG. 2 provides a cross-sectional view of a portion of the framed air filter 10 of FIG. 1. The framed air filter 10 provides an upstream side 11a and a downstream side 11b, and includes a filer media 12 and a frame 14. The frame 14 is mounted generally on, and surrounds, a perimeter 16 of the filter media 12. The framed air filter 10 can be rectangular in shape (which specifically includes square shapes) having corners 18. The perimeter 16 of the filter media 12 thus can have a generally rectangular shape (which does not preclude irregularities, notches, chamfered or angled corners, or the like, along or in the perimeter 16). The frame 14 may thus take the form of a rectangular frame with four elongated frame segments 20 that are each mounted on one of the four major edges of the filter media 12. For ease of identification, the four major segments 20 of the frame 14 may occasionally be referred to herein by a lettered subscript (e.g., a, b, c, or d). The four major frame segments 20 combine to define four frame corners 22.

Some features of the present disclosure relate to formation of two (or more) of the major frame segments 20, and the corresponding frame corner 22 there between, from a single strip of framing material. To better understand features of the single strip and corresponding manufacturing techniques of the present disclosure (including mounting to the filter media 12), an explanation of optional panels or walls provided with each of the frame segments 20 is beneficial. In some embodiments, the frame segments 20 can be highly similar. With this in mind, and as shown in FIG. 2, the major frame segments 20 can form or define a downstream panel 30 and an upstream panel 32. The panels 30, 32 can, upon final assembly, be generally parallel to each other and capture (e.g., pinch) a portion 33 of the perimeter 16 of the filter media 12 therebetween. In some embodiments, an inwardmost edge 34 of the downstream panel 30 may be aligned (along an inward-outward direction, as shown in FIG. 2) within e.g., about 2 mm, 1 mm, or 0.5 mm, on average, of an inwardmost edge 36 of the upstream panel 32.

The major frame segment 20 further includes an outer side wall 40 and an inner side wall 42. The outer side wall 40 extends outward and downstream from the upstream panel 32, and is foldably connected thereto by a fold line 44. The inner side wall 42 extends outward and downstream from the downstream panel 30, and is foldably connected thereto by a fold line 46. The outer and inner side walls 40, 42 are connected at a fold line 48. Such fold lines can be provided by any known method, such as by scoring, partially perforating, or using any other suitable method to provide a path along which a fold may be preferentially formed. Further, at least the fold line 46 may not be a line of folding pre-scored or otherwise pre-imparted into a material of the major frame segment 20; any folding or curvature at or between a combination of the upstream panel 32 and the inner side panel 42 can be accomplished by the techniques and equipment used in the assembly process. In some embodiments, all four of the major frame segments 20 (FIG. 1) include the panels 30, 32 and the side walls 40, 42, along with the foldable connections therebetween. In this context, the term "foldable" signifies that the major frame segment 20 is formed (i.e., into the general configuration of FIG. 2) by folding the various panels and side walls of the major frame segment 20 relative to each other along the various fold lines (as described in detail below). The term does not denote that the frame segment (or the entirety of the frame 14), once formed, is foldable in the sense that it can be collapsed or folded flat. In fact, as will be made clear herein, in various embodiments the frame 14, once formed, may not be collapsible or foldable.

In various embodiments, the outer side wall 40 and the inner side wall 42 are positioned at an angle to each other (when viewed in cross section as shown in FIG. 2, and as measured by the vertex provided by the fold line 48) of less than about 40, 30, 20, or 10 degrees. In further embodiments, the outer side wall 40 and the inner side wall 42 can be generally parallel to each other. Regardless, the inner side wall 42 is oriented at a nominal tilt angle T of greater than 90 degrees (preferably at least 95 degrees) to about 150 degrees relative to the downstream panel 30. For example, in the exemplary embodiment of FIG. 2, the inner side wall 42 is oriented at a tilt angle T of approximately 130 degrees from the downstream panel 30. The designation "nominal" is used in recognition of the fact that this tilt angle T may occur along the elongate length of the major frame segment 20. Often the outer side wall 40 may form a generally similar angle with respect to the upstream panel 32.

In specific embodiments in which the side wall tilt angle T is greater than 90 degrees, the framed air filter 10 may not be nestable. In other embodiments in which the side wall tilt angle T is greater than 90 degrees (e.g., is greater than about 105 degrees), the framed air filter 10 may be nestable. By "nestable" it is meant that multiple framed air filters 10 (of the same shape and size) can be stacked so that they collectively occupy less than 90% of the total height obtained by multiplying the depth of each framed air filter 10 by the number of framed air filters 10. For purposes of such calculation, the depth of a framed air filter is the distance, along an axis normal to the major plane of the framed air filter, from the farthest downstream point of the framed air filter (which, in the depiction of FIG. 2 is the fold line 48) to the farthest upstream point of the framed air filter (which, in the depiction of FIG. 2, is the upstream panel 32).

With the above explanations in mind, and returning to FIG. 1, in some embodiments, pairs of the major frame segments 20 (each including the panels and side walls described above) are formed from a single, common material strip. For example, the first and second major frame segments 20a, 20b can be formed from a first material strip 60 (referenced generally), whereas the third and fourth major frame segments are formed from a second material strip 62 (referenced generally). In other embodiments, three or all four of the major frame segments 20a-20d are formed from a single, common material strip. Regardless, and as described in greater detail below, the single material strip 60, 62 integrally forms at least one of the frame corners 22 upon final, folded assembly (e.g., as identified in FIG. 1, the first material strip 60 integrally forms the frame corner 22a at the intersection of the first and second major frame segments 20a, 20b).

The material strip(s) 60, 62 can be made of any suitable material, such as paperboard, plastic, metal, etc., into which may be imparted fold or score lines as described herein. In some embodiments, the material strip(s) 60, 62 can be made of paperboard of thickness in the range of 20-30 thousandths of an inch. In some embodiments, the material strip(s) 60, 62 is single-layer paperboard rather than corrugated paperboard.

Figure 6A:
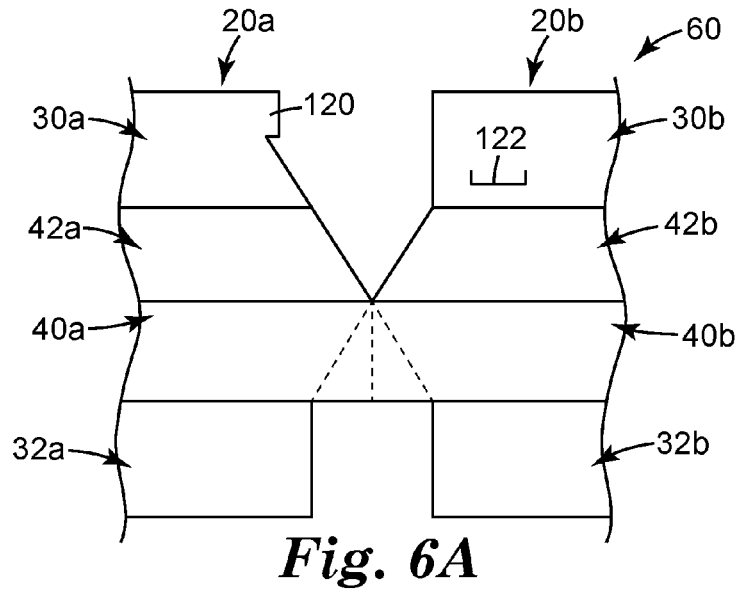
FIG. 6A is a plan view of another material strip in a flat state. This material strip can be useful in forming two or more major frame segment components of the framed air filter of the type generally shown in FIG. 1.
Figure 6B:
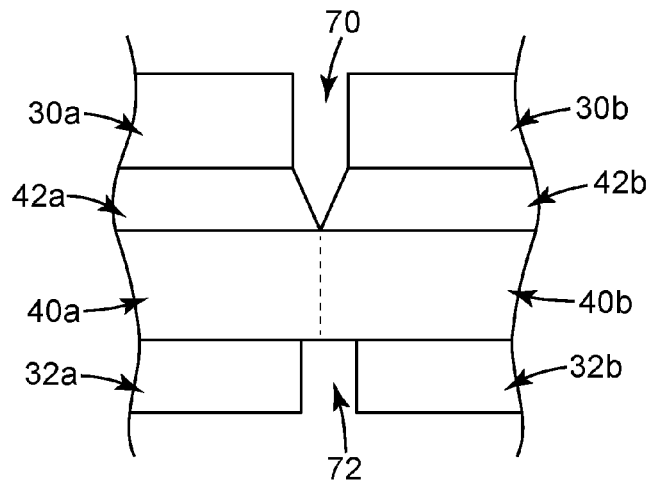
FIG. 6B is a plan view of another material strip in a flat state. This material strip can be useful in forming two or more major frame segment components of the framed air filter of the type generally shown in FIG. 1.
Figure 6C:
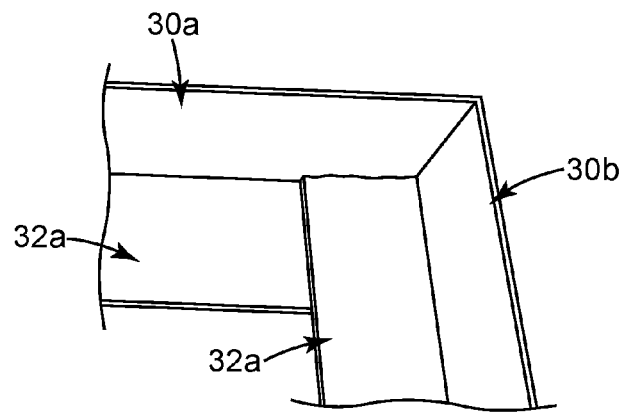
FIG. 6C is a schematic drawing generally showing how the embodiments of FIGS. 6A and 6B can be folded to create a corner.
Figure 7A:
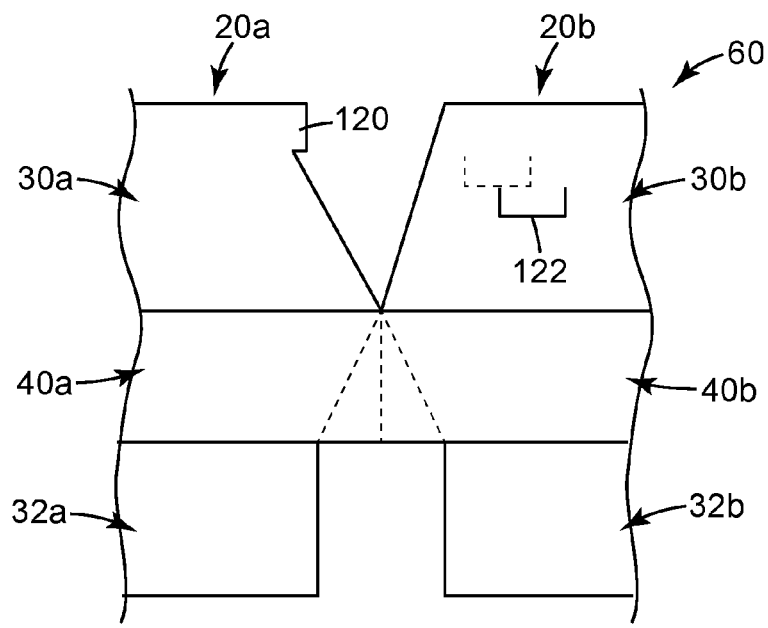
FIG. 7A is a plan view of another material strip in a flat state. This material strip can be useful in forming two or more major frame segment components of the framed air filter of the type generally shown in FIG. 1.
Figure 7B:
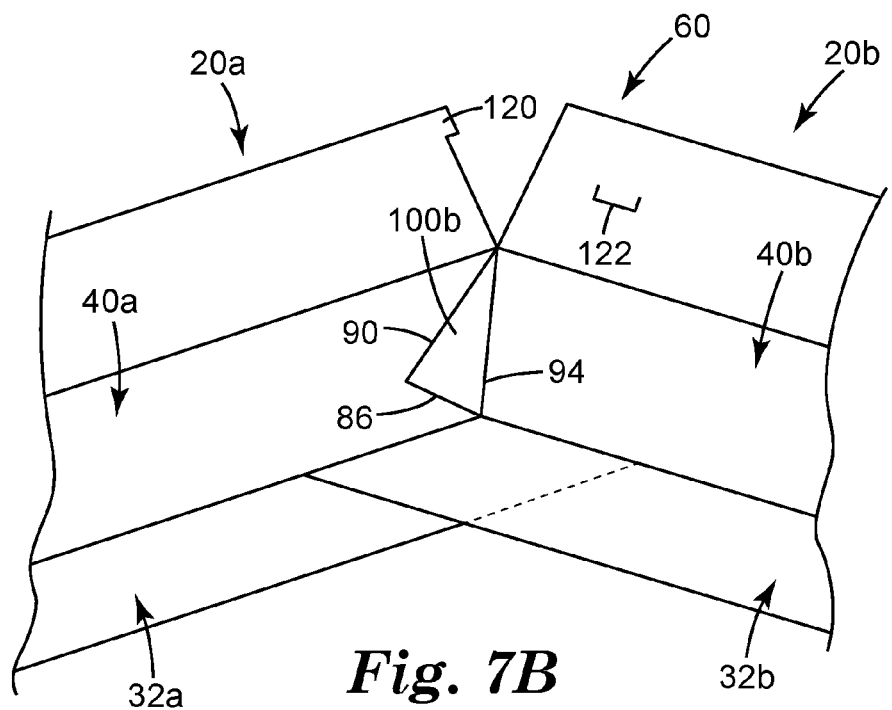
FIGS. 7B and 7C are schematic drawings generally showing how the embodiments of FIG. 7A can be folded to create a corner.
Figure 7C:
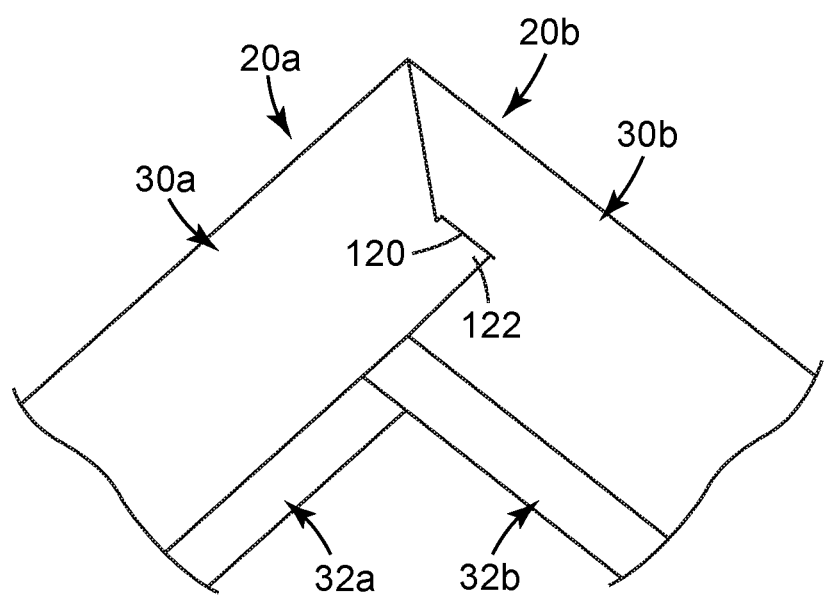

With embodiments in which pairs of the major frame segments 20 are formed by two material strips, the first and second material strips 60, 62 can be substantially identical. FIG. 3 provides a plan view of a portion of an exemplary embodiment of the first material strip 60 in a flat state (i.e., prior to folding to the final folded state of FIGS. 1 and 2). It will be understood that geometries, etc., associated with the FIGURES of the present application, including but not limited to the views of FIGS. 3 and 6, is not necessarily to scale. As indicated above, the first material strip 60 will be folded/processed to form the first and second major frame segments 20a, 20b (referenced generally in FIG. 3, shown in greater detail in FIG. 1), and thus in the flat state forms or includes various sections that will become the panels and side walls (described above) of the first and major frame segments 20a, 20b. Thus, and as identified in FIG. 3, the first material strip 60 includes the downstream and upstream panels 30a, 32a of the subsequently created first major frame segment 20a, as well as the downstream and upstream panels 30b, 32b of the subsequently created second major frame segment 20b. The outer and inner side walls 40a, 42a of the subsequently created first major frame segment 20a are provided, as are the outer and inner side walls 40b, 42b of the subsequently created second major frame segment 20b. As shown, in the flat state, the downstream panels 30a, 30b are generally aligned with one another relative to a length of the material strip 60, as are the inner side walls 42a, 42b, the outer side walls 40a, 40b, and the upstream panels 32a, 32b. However, only the outer side walls 40a, 40b are contiguous or connected to one another along a length of the material strip 60. A first cut-out section 70 is formed through a thickness of the material strip 60 that physically separates the first major frame segment downstream panel 30a from the second major frame segment downstream panel 30b, and physically separates the two inner side walls 42a, 42b. A second cut-out section 72 is formed through a thickness of the material strip 60 that physically separates the first major frame segment upstream panel 32a from the second major frame segment upstream panel 32b. A side edge 74 of the first upstream panel 32a is thus spatially separated from an opposing side edge 76 of the second upstream panel 32b in the flat state (in being understood that the first and second upstream panels 32a, 32b, each extend to and terminate at a second, opposite side edge, respectively, that is not shown in the partial view of FIG. 3). The side edges 74, 76 may or may not be parallel. In some embodiments, a slightly non-parallel relationship is desired to promote improved fit upon final assembly due to material thickness, process tolerances, etc.

Aspects of the present disclosure relate to features of the second cut-out section 72 and at an intersection of the two outer side walls 40a, 40b that promote simple or ready transition of the material strip 60 from the flat state (of FIG. 3) to the final assembled state (of FIG. 1) in which the material strip 60 integrally forms one of the frame corners 22 (FIG. 1) as well as two of the major frame segments 20 (FIG. 1). Optional features provided at one or more of the downstream panels 30a, 30b and the inner side walls 42a, 42b that can promote the material strip 60 self-maintaining the folded state are described below.

A joint section 80 (referenced generally) is defined along a region of intersection between the two outer side walls 40a, 40b by various fold or score lines. As a point of clarification, the outer side walls 40a, 40b can each be viewed as having opposing major edges in the lateral direction, with the corresponding major edges of the outer side walls 40a, 40b being substantially aligned with one another; for example, the first outer side wall 40a defines opposing major edges 82a, 84a, whereas the second outer side wall 40b defines opposing major edges 82b, 84b. The first major edges 82a, 82b each correspond with, or are defined at, the corresponding fold line 48a, 48b between the respective outer side wall 40a, 40b and the corresponding inner side wall 42a, 42b. The second major edges 84a, 84b each correspond with, or are defined at, the corresponding fold line 44a, 44b between the respective outer side wall 40a, 40b and the corresponding upstream panel 32a, 32b. In a region of the second cut-out section 72, the second major edges 84a, 84b are exposed or not otherwise connected to any other physical structure of the material strip 60. Stated otherwise, the joint section 80 can be described as having a trailing edge 86 collectively defined by portions of the second major edges 84a, 84b at the second cut-out section 72. With these designations in mind, the joint section 80 includes a first or vertical score line 90 formed at the point of intersection of the outer side walls 40a, 40b. The vertical score line 90 can substantially bisect a shape of the second cut-out section 72. A second score line 92 is formed in the first major frame segment outer side wall 40a, extending between the first and second major edges 82a, 84a at an angle that is non-perpendicular and non-parallel relative to the lines defined by the major edges 82a, 84a. For example, the second score line 92 can extend from a point of intersection with the vertical score line 90 at the first major edge 82a to the second major edge 84a at a location that is laterally off-set or spaced from the vertical score line 90. In some embodiments, a location of the second score line 92 at the second major edge 84a is substantially aligned with the side edge 74 of the first upstream panel 32a as in the design shown in FIG. 3. A substantially identical third score line 94 is formed in the second major frame segment outer side wall 40b, extending between the corresponding first and second major edges 82b, 84b. The third score line 94 can be a substantially mirror image of the second score line 92 relative to the vertical score line 90, extending from a point of intersection with the vertical score line 90 at the first major edge 82b to a point along the second major edge 84b that can be substantially aligned with the side edge 76 of the second upstream panel 32b. As a point of clarification, the term "score line" is used herein to assist the reader in distinguishing the score lines 90-94 from the various fold lines described above. However, the "score lines" 90-94 are not limited to being formed by a scoring operation, but instead are more generically fold lines that can be provided by any known method, such as scoring, partially perforating, or using any other suitable method to provide a path along which a fold may preferentially be formed.

The vertical and second score lines 90, 92 combine to define a triangular flap 100a in the first outer side wall 40a. A substantially similar triangular flap 100b is defined in the second outer side wall 40b by the vertical and third score lines 90, 94. As shown, the three score lines 90-94 substantially intersect at a common point 110 at an intersection of the first major edges 82a, 82b. The three score lines 90-94 allow the triangular flaps 100a, 100b to inwardly fold in forming the frame corner 22a (FIG. 1), which allows the common point 110 (and thus the first major edges 82a, 82b) to remain spatially stationary while pulling the second major edges 84a, 84b inward toward one another. Further, the second cut-out section 72 optionally spans the full width of the joint section 80 (i.e., distance between the second and third score lines 92, 94 at the contiguous second major edges 84a, 84b), allowing the first and second upstream panels 32a, 32b to overlap one another in forming the frame corner 22a.

Figure 8:
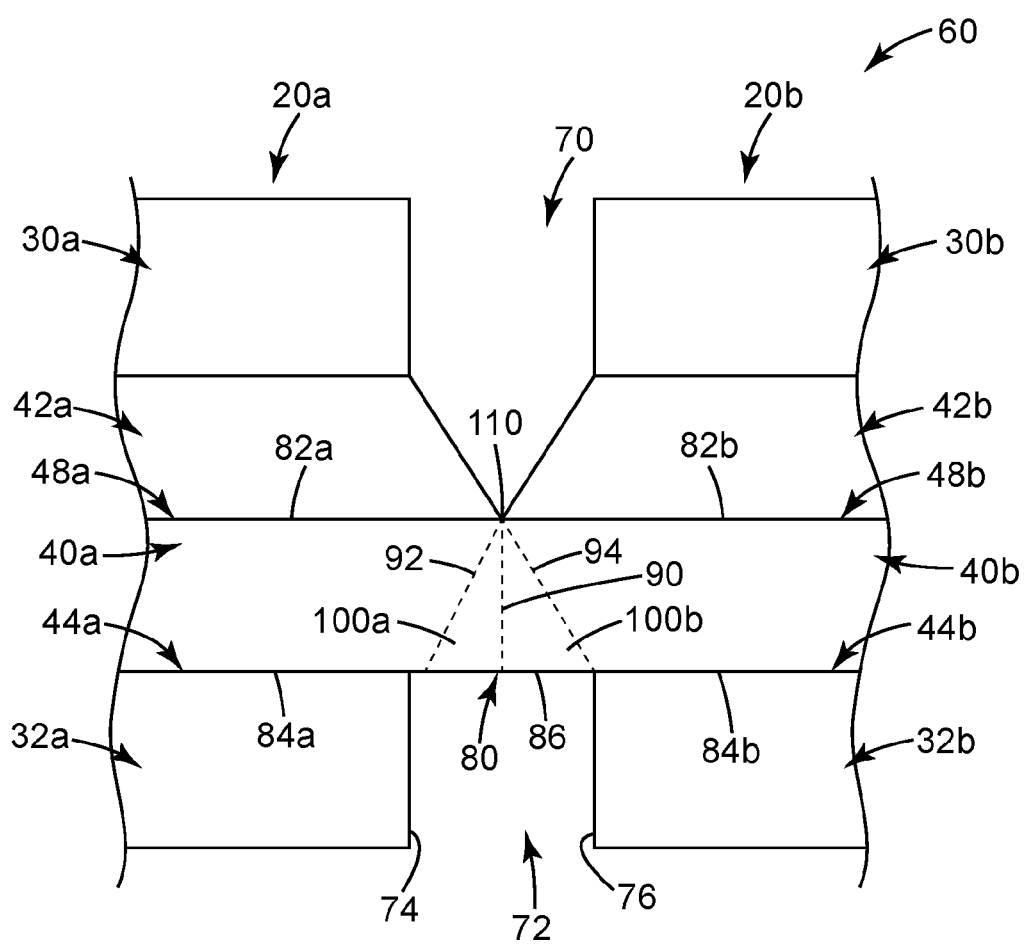
FIG. 8 is a plan view of another exemplary material strip in a flat state and useful in forming two or more major frame segment components of the framed air filter of FIG. 1.

In some embodiments, the corner is not symmetric. In some instances, having non-symmetric corners permits the filters and/or frames to better nest. In some embodiments, one or both of the upstream panels 32a, 32b over or under hanging the corresponding score line 92, 94 (e.g., the side edge 74 of the first upstream panel 32a can be off-set from the terminal end of the second score line 92 at the second major edge 84a, as in the design shown in FIG. 8, and/or the side edge 76 of the second upstream panel 32b can be off-set from the terminal end of the third score line 94 at the second major edge 84b). Some embodiments include score lines 92, 94 with an asymmetric geometry relative to score line 90. Such an arrangement may help predispose the folded flap to one side during assembly. Additionally or alternatively, such an arrangement may promote improved fit upon final assembly due to material thickness, process tolerances, etc.

Figure 4A:
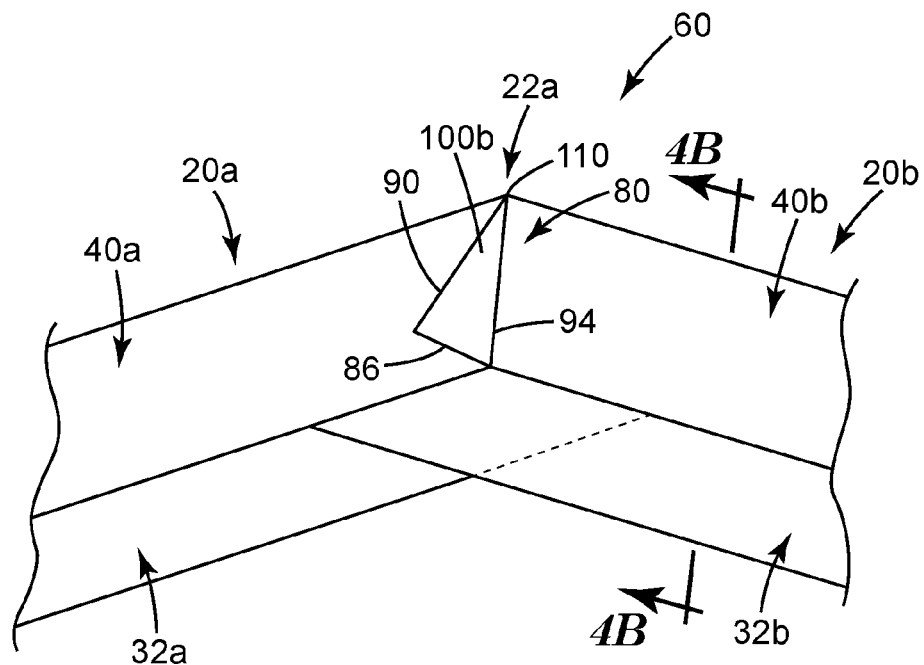
FIG. 4A is a simplified perspective view of a portion of the material strip of FIG. 3 in a folded state.
Figure 4B:
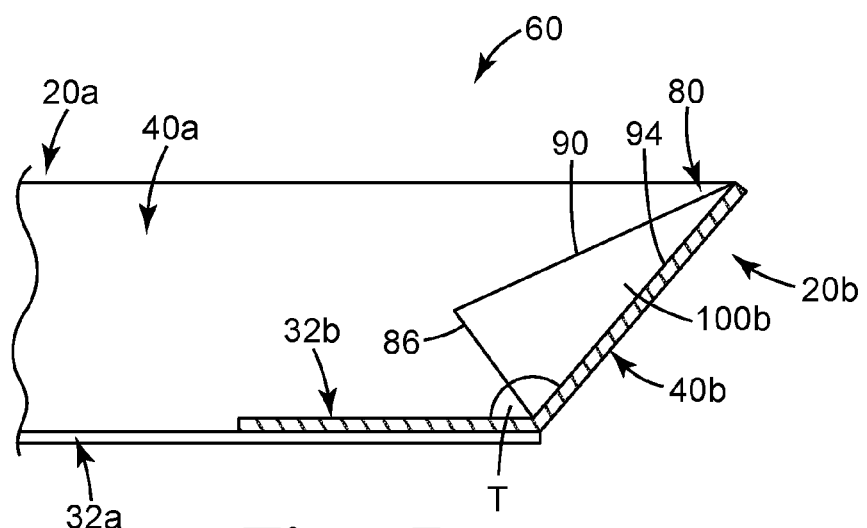
FIG. 4B is a cross-sectional view of a portion of the arrangement of FIG. 4A, taken along the line 4B-4B.

Transitioning of the material strip 60 from the flat state of FIG. 3 to the final, folded state is reflected in FIGS. 4A and 4B. For ease of explanation, the downstream panels 30a, 30b (FIG. 3) and the inner side walls 42a, 42b (FIG. 3) are omitted from the views of FIGS. 4A and 4B. As shown, the material strip 60 has been folded to integrally form the first and second major frame segments 20a, 20b and the frame corner 22a. In particular, the first and second outer side walls 40a, 40b have been pulled toward one another, with a structure of the joint section 80 effectively pivoting at the common point 110. The material strip 60 has folded along each of the score lines 90-94 (it being understood that in the views of FIGS. 4A and 4B, the second score line 92 is hidden), with the second and third score lines 92, 94 being brought into substantial abutment with one another. The triangular flaps 100a, 100b (it being understood that the triangular flap 100a of the first outer side wall 40a is hidden in the views of FIGS. 4A and 4B) project or fold inwardly away from a remainder of the corresponding outer side wall 40a, 40b. FIGS. 4A and 4B illustrates that with the folding action, the trailing edge 86 of the joint section 80 has "lifted" upwardly from a plane of the fold lines 44a, 44b between the second side walls 40a, 40b and the corresponding upstream panel 32a, 32b. The joint section 80 thus has a folded, triangular shape in the final, folded state, and can be arranged or nested against one of the two outer side walls 40a, 40b (in the views of FIGS. 4A and 4B, the joint section 80 is arranged or nested substantially against the outer side wall 40a of the first major frame segment 20a). Further, as the outer side walls 40a, 40b are pulled toward one another, the upstream panels 32a, 32b are brought into an overlapping arrangement. For example, in FIGS. 4A and 4B, the upstream panel 32b of the second major frame segment 20b is disposed over the upstream panel 32a of the first major frame segment 20a. Alternatively, the first upstream panel 32a can be arranged over the second upstream panel 32b during the folding process. Regardless, FIG. 4B illustrates that upon completion of the folding process, the material strip 60 in the final folded form defines the tilt angle T in both of the first and second major frame segments 20a, 20b.

Figure 5A:
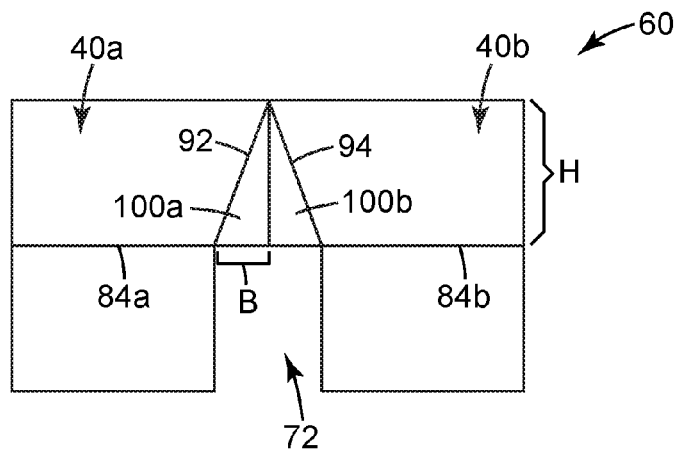
FIG. 5A is a simplified plan view of a portion of the material strip of FIG. 3 illustrating various geometric relationships in the flat state.
Figure 5B:
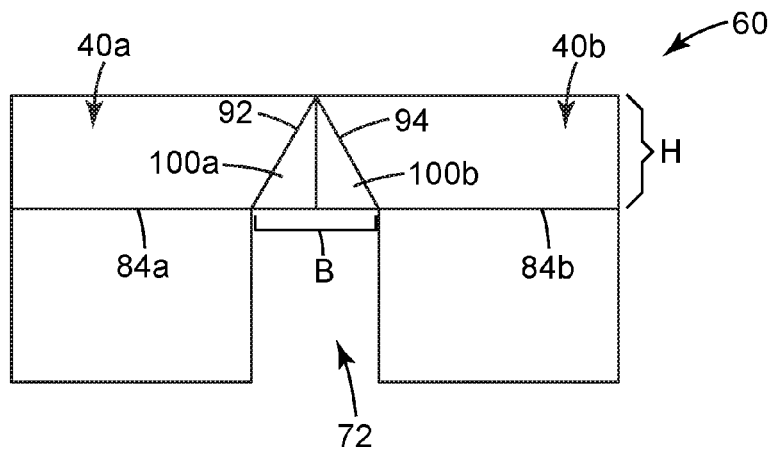
FIG. 5B is a simplified plan view of a portion of the material strip of the type generally shown in FIG. 3 illustrating various geometric relationships in the flat state of an exemplary embodiment.
Figure 5C:
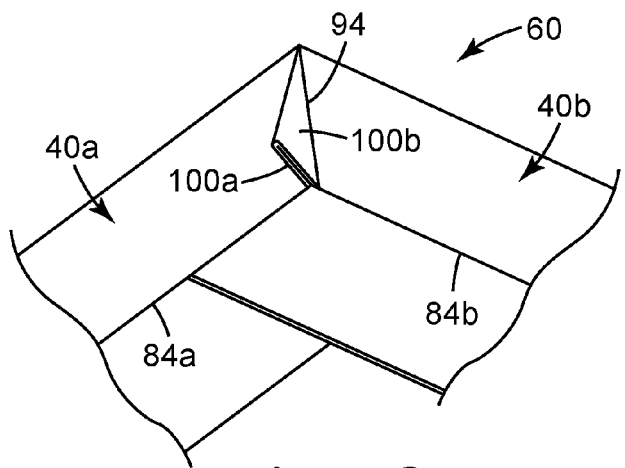
FIG. 5C is a schematic drawing generally showing how the embodiments of FIGS. 5A and 5B can be folded to create a corner.

A geometric analysis of the joint section 80 is considered in FIG. 5, which denotes the relationship between a length H of the outer side walls 40a, 40b and a one-half width distance B of the second cut-out section 72. The geometric relationship established by the angle of the second and third score lines 92, 94 relative to the corresponding second major edge 84a, 84b effectively establishes the nominal tilt angle T (FIG. 4B) between the outer side wall 40a, 40b and the corresponding upstream panel 32a, 32b in the final, folded state of the major panel segments 20a, 20b (FIGS. 1 and 2) as described above. For example, in folding the material strip 60 from a square corner in the flat state, the outer side walls 40a, 40b each "push" inwardly in two dimensions at the corresponding triangular flap 100a, 100b by the one-half width distance B, generating a tilt angle T that can be approximated (assuming zero material thickness) as:

$$\text{tilt angle }(T)=\arcsin(B/H).$$

Given this relationship, the material strip 60 can be designed to provide a wide range of tilt angles in the resultant frame segment 20 (FIG. 1), and thus in the frame 14 (FIG. 1) as a whole, that in turn can provide varying degrees of nestability as desired for a particular application. By way of several non-limiting examples, assuming an outer side wall length H of ⅞ inch, a one-half width distance B of 1 inch provides a tilt angle T of approximately 125 degrees; a one-half width distance B of 0.5 inch provides a tilt angle T of approximately 107 degrees; a one-half width distance B of 1.5 inches provides a tilt angle T of approximately 149 degrees.

Returning to FIG. 3, the first cut-out section 70 is sufficiently sized so that the downstream panels 30a, 30b and inner side walls 42a, 42b do not interfere with the above-described transitioning of the material strip 60, and in particular the joint section 80, from the flat state of FIG. 3 to the final folded state of FIGS. 4A and 4B. In general terms, following arrangement of the material strip 60 to the folded state of FIGS. 4A and 4B (in which the joint section 80 is folded inwardly and upwardly, and the upstream panels 32*a*, 32*b* overlap one another as described above), the inner side walls 42*a*, 42*b* are each folded downwardly over the corresponding outer side wall 40*a*, 40*b*, and the downstream panels 30*a*, 30*b* are each folded/arranged over the corresponding upstream panel 32*a*, 32*b* as generally reflected in FIG. 2. In some embodiments, it may be beneficial for the material strip 60 to include features whereby the two or more of the inner side walls 42*a*, 42*b* and the downstream panels 30*a*, 30*b* interface with one another to more robustly self-retain the final, folded state. For example, and as shown in FIG. 6, a locking tab 120 and a slot 122 can be provided. The locking tab 120 is formed as a projection from an edge of the one of the upstream panels 30*a*, 30*b*, whereas the slot 122 is formed in the other downstream panel 30*a*, 30*b*. With the exemplary embodiment of FIG. 6, the locking tab 120 is provided with the downstream panel 30*a* of the subsequently created first major frame segment 20*a*, whereas the slot 122 is formed in the downstream panel 30*b* of the subsequently created second major frame segment 20*b*. An opposite relationship is equally acceptable. Upon final assembly to the folded state, the locking tab 120 is inserted or tucked into the slot 122 and frictionally retains the material strip 60 in the folded state. A wide variety of other self-retention type features or arrangement are equally acceptable, for example any of the features described in U.S. Publication No. 2013/0327004, entitled "Framed Air Filter With Offset Slot, and Method of Making," the entire teachings of which are incorporated herein by reference. In summary, the self-retention features, where included, can provide that components of two neighboring major frame segments otherwise integrally formed by a single material strip may interact with each other in a self-stabilizing manner so as to collectively reduce the tendency of the material strip to unfold from the folded state. With additional reference to FIG. 1, a thus-formed frame corner 22 of the frame 14 (as integrally formed by the single material strip 60) may thus be self-stabilizing while the frame 14 is in a partially assembled condition.

In related embodiments, locking tabs and/or slots can be provided along the material strip 60 at locations opposite the joint section 80 that facilitate connection between two, separate material strips in completing the frame 14. For example, with the exemplary embodiment, the first and second material strips 60, 62 can provide complimentary, interlocking-type features that assemble to one another in forming the second and fourth frame corners 22*b*, 22*d* as would be apparent to one of ordinary skill (and examples of which are provided in the '004 Publication).

While the discussions above have focused primarily on the exemplary case of two separate material strips 60, 62, it will be appreciated that the present disclosure is not limited to such cases. Thus, the use of the integrated nestable joint as disclosed herein encompasses the use of such a feature in the producing of the complete frame 14 by the folding of a single, integral material strip. The single, integral material strip could include three of the joints as described above that otherwise assist in forming three of the frame corners 22 as part of a folding operation. The fourth frame corner 22 could be defined as the single material strip were folded to bring opposing ends thereof into a substantially abutted relationship (and that may include the interlocking features described above). Regardless, frames 14 of the present disclosure can be formed to any desired shape and size (e.g., standard nominal sizes of 20"×20"×1", 20"×25"×1", etc.).

Complete assembly of the framed air filter 10 includes arranging the one (or more) material strips 60 to the folded state of FIGS. 4A and 4B; where two of the material strips 60, 62 are provided, the so-folded strips 60, 62 are interlocked to one another as described above. With the downstream panel 30 lifted away from the corresponding upstream panel 32, a suitable bonding adhesive can be deposited on to the exposed downstream face of the upstream panel 32 of each of the major frame segments 20. An additional bonding adhesive can optionally be deposited between the joint section 80 and the outer side wall 40 to which abutted contact or nesting is desired. In some cases, it may be desirable to apply additional adhesive for attaching the outer and inner side walls 40, 42. The filter media 12 may then be placed into the partially-complete frame 14, with a bondable border area of the filter media 12 in overlapping relation with at least a portion of the upstream panel 32. While the exemplary illustration of FIG. 2 shows the perimeter 16 of the filter media 12 terminating at a particular point between the downstream and upstream panels 30, 32, any suitable design can be used. For example, the edge of the filter media 12 may extend into the space between the outer and inner side walls 40, 42 as desired. Additional bonding adhesive may be deposited atop the downstream face of the filter media 12; or (depending e.g., on the viscosity of the adhesive and the porosity and wicking characteristics of the filter media 12), some of the previously-applied bonding adhesive may penetrate through the filter media 12 and minimize or eliminate the need to apply additional adhesive. The material strip(s) 60, 62 is then further folded as described above to bring the downstream panels 30 into contact with the downstream face of the filter media 12; where provided, the complimentary interlocking features provided with the material strip(s) 60, 62 are engaged to complete the frame 14 and prevent the material strip(s) 60, 62 from unfolding as the bonding adhesive cures.

It has been found that with the designs of the present disclosure, the desired tilt angle T of the outer and inner side walls 40, 42 of the completed frame 14 may be largely, or completely, set by the design of the material strips 60, 62 themselves, rather than having to use special tooling to dictate the tilt angle T. Such tooling may nevertheless be used if desired. It has further been found that filter frames as disclosed herein, once fully assembled and with the bonding agent fully solidified, are not collapsible. That is, in ordinary handling, packaging, and use of the framed air filters of the present disclosure, the side walls 40, 42 cannot be fully flattened outward into the major plane of the filter media 12 to any significant extent, nor can they be flattened inward into the major plane of the filter media 12 to any significant extent, without causing unacceptable damage to the frame 14. The term "fully flattened" is used in recognition of the fact that it might be possible, especially in the case of a very long (e.g., 25 inches or more) major frame segment, to appreciably deform a section of the frame 14 toward the center of the elongated length of the frame 14. However, for purposes of denoting a frame as not collapsible, it will be appreciated that even if some such deformation toward the center of the elongated length of the frame 14 is possible, it will not be possible in the sections of the frame 14 that are proximate (e.g., within a few centimeters of) the frame corners 22.

Any suitable air filter media can be used as the filter media 12. The air filter media 12 may conveniently comprise the rectangular-shaped perimeter 16 that in turn may be sized and shaped to match the size and shape of the frame 14 (or vice-versa). The filter media 12 is typically sheet-like, with a length and width that are greater than a thickness of the filter media 12 and with an overall planar configuration (even if pleated). Although FIGS. 1 and 2 illustrate the filter media 12 as being non-pleated, any suitable filter media format, including pleated, may be used. As a point of reference, one common technique for incorporating a pleated filter media into the "pinch" type frames of the present disclosure is to flatten the pleats on two or four edges of the pleated filter media pack to provide a more planar region to be captured between the downstream and upstream panels 30, 32. In some embodiments, the filter media 12 can comprise an electret-comprising nonwoven material. In some embodiments, the filter media 12 may comprise fiberglass fibers.

In some embodiments, the filter media 12 (whether pleated or in a substantially flat state or otherwise) may include one or more layers comprising an open cell structure, a porous media, one or more nonwoven scrims, reinforcing filaments, nettings, wire meshes, or any such structure(s) that may be provided along with the filter media 12 (e.g., bonded thereto) and which can be made of any suitable material. Whether inherently, or by way of a reinforcing layer, it may be advantageous that the filter media 12 be sufficiently strong to survive the air pressure applied in conventional forced-air heating and/or cooling systems. Further advantages may be gained if the filter media 12 is able to enhance the frame strength, for example by distributing the air-pressure load over the various portions of the frame 14.

In some embodiments, the filter media 12 may comprise a bondable border area that may be sandwiched between portions of the downstream and upstream panels 30, 32, and may be attached to one or both panels (e.g., by adhesive and/or by mechanical fasteners such as staples). Although not shown in FIG. 2, some filter media useful with the present disclosure may be somewhat compressible, such that the capturing of the filter media 12 between the downstream and upstream panels 30, 32 and the pressing of the frame 14 may cause the filter media 12 to be compressed (e.g., as much as 10, 20, 30% or more) from its uncompressed thickness.

Although specific embodiments of the present disclosure have been shown and described herein, it is understood that these embodiments are merely illustrative of the many possible specific arrangements that can be devised in application of the principles of the present disclosure. Numerous and varied other arrangements can be devised in accordance with these principles by those of ordinary skill in the art without departing from the spirit and scope of the present disclosure. Thus, the scope of the present disclosure should not be limited to the structures described in this application, but only by the structures described by the language of the claims and the equivalents of those structures.

What is claimed is:

1. A frame capable of being used in an air filter, wherein the frame includes four major frame segments, comprising:
   a single strip of framing material forming at least two of the major frame segments and the frame corner between the two major frame segments; wherein the frame is nestable and wherein the single strip of framing material strip includes:
   first and second downstream panels,
   first and second inner side walls interconnected to a corresponding one of the downstream panels at a fold line,
   first and second outer side walls interconnected to a corresponding one of the inner side walls at a fold line,
   first and second upstream panels interconnected to a corresponding one of the outer side walls at a fold line,
   a joint portion formed at region of intersection between the first and second outer side walls, the joint portion including:
      a first, vertical score line interconnecting the first and second outer side walls,
      a second score line in the first outer side wall and extending in non-perpendicular fashion immediately adjacent the first score line,
      a third score line in the second outer side wall and extending in non-perpendicular fashion immediately adjacent the first score line,
      a first cut-out portion separating the first and second downstream panels and separating the first and second inner side walls, and
      a second cut-out portion locating adjacent the joint portion and separating the first and second upstream panels;
         and wherein a side edge of the first upstream panel defines a first edge of the second cut-out portion and wherein the side edge of the first upstream panel is offset from a terminal end of the second score line.

2. The frame of claim 1, wherein the single strip forms three of the major frame segments and two frame corners between the three major frame segments.

3. The frame of claim 1, wherein each major frame segment includes a first side wall and a second side wall and wherein the first side wall and the second side wall are at least one of (1) parallel to one another or (2) positioned at an angle of less than 40 degrees to one another.

4. The frame of claim 3, wherein each of the first and second side walls have a side wall tilt angle that is between 95 degrees and 150 degrees.

5. The frame of claim 3, wherein each of the first and second side walls have a side wall tilt angle that is between 100 degrees and 130 degrees.

6. The frame of claim 1, further comprising one or more self-retention features.

7. The frame of claim 1, further comprising:
   air filtration media attached to or adjacent to the frame; and
   wherein the air filtration media is at least one of pleated or flat.

8. The frame of claim 7, wherein the air filtration media is at least one of a nonwoven material, an electret-comprising nonwoven material, or a fiberglass-containing material.

9. The frame of claim 7, wherein the air filtration media is at least one of a nonwoven material, an electret-comprising nonwoven material, or a fiberglass-containing material.

10. The frame of claim 7, further comprising:
    at least one of an open cell structure layer, a porous media layer, a nonwoven scrim layer, a reinforcing filament layer, a netting, or a wire mesh.

11. A method of at least partially assembling at least a portion of a frame of a framed air filter, the method comprising:
    receiving a material strip defining:
    first and second downstream panels,
    first and second inner side walls interconnected to a corresponding one of the downstream panels at a fold line, first and second outer side walls interconnected to a corresponding one of the inner side walls at a fold line, first and second upstream panels interconnected to a corresponding one of the outer side walls at a fold line, a joint portion formed at region of intersection between the first and second outer side walls, the joint portion including:

a first, vertical score line interconnecting the first and second outer side walls, a second score line in the first outer side wall and extending in non-perpendicular fashion immediately adjacent the first score line, a third score line in the second outer side wall and extending in non-perpendicular fashion immediately adjacent the first score line, a first cut-out portion separating the first and second downstream panels and separating the first and second inner side walls, a second cut-out portion locating adjacent the joint portion and separating the first and second upstream panels;

folding the material strip at the joint portion to bring the first and second outer side walls toward one another, including the joint folding at each of the first-third score lines and further including the second and third score lines being brought into substantial abutment to define a corner;

further folding the material strip to locate the first inner side wall over the first outer side wall, the first downstream panel over the first upstream panel, the second inner side wall over the second outer side wall, and the second downstream panel over the second upstream panel;

wherein following the steps of folding, the material strip is transitioned to define first and second major frame segments intersecting at a corner, and wherein a side edge of the first upstream panel defines a first edge of the second cut-out portion and wherein the side edge of the first upstream panel is offset from a terminal end of the second score line.

12. The method of claim 11, wherein following the steps of folding the first inner and outer side walls of the first major frame segment form a tilt angle relative to the corresponding first upstream and downstream panels of greater than 90 degrees.

13. The frame of claim 1, wherein a side edge of the second upstream panel defines a second, opposing edge of the second cut-out portion and wherein the side edge of the second upstream panel is aligned with the terminal end of the third score line so that the side edge of the second upstream panel is not offset from the terminal end of the third score line.

* * * * *

UNITED STATES PATENT AND TRADEMARK OFFICE
CERTIFICATE OF CORRECTION

Page 1 of 1

PATENT NO. : 9,962,640 B2
APPLICATION NO. : 14/665078
DATED : May 8, 2018
INVENTOR(S) : Fox

It is certified that error appears in the above-identified patent and that said Letters Patent is hereby corrected as shown below:

In the Specification

<u>Column 10</u>
Line 51 (Approx.), Delete "arc sin" and insert -- arcsin --, therefor.

In the Claims

<u>Column 16</u>
Line 10, In Claim 11, after "and" insert -- , --.

Signed and Sealed this
Ninth Day of April, 2019

Andrei Iancu
*Director of the United States Patent and Trademark Office*